(12) United States Patent
Hurler

(10) Patent No.: US 6,464,446 B1
(45) Date of Patent: Oct. 15, 2002

(54) VEHICLE WITH LOADING BOXES FOR RECEIVING LOADS

(76) Inventor: Walter Hurler, Haldenweg 16, D-86647 Buttenwiesen (DE)

( * ) Notice: Subject to any disclaimer, the term of this patent is extended or adjusted under 35 U.S.C. 154(b) by 0 days.

(21) Appl. No.: 09/762,113

(22) PCT Filed: Aug. 4, 1999

(86) PCT No.: PCT/EP99/05653
§ 371 (c)(1), (2), (4) Date: Feb. 2, 2001

(87) PCT Pub. No.: WO00/07843
PCT Pub. Date: Feb. 17, 2000

(30) Foreign Application Priority Data

Aug. 5, 1998 (DE) .......................... 298 13 993

(51) Int. Cl.[7] ................................. B60P 1/02
(52) U.S. Cl. ........................ 414/545; 414/495
(58) Field of Search ................. 414/545, 495

(56) References Cited

U.S. PATENT DOCUMENTS

| | | | |
|---|---|---|---|
| 2,714,735 A | * 8/1955 | Watson | 414/401 |
| 3,666,130 A | 5/1972 | Ellerd | |
| 4,302,145 A | * 11/1981 | Heisler | 187/400 |
| 4,708,572 A | 11/1987 | Koelker | |
| 5,803,698 A | * 9/1998 | Honersch et al. | 414/495 |
| 5,848,870 A | * 12/1998 | Smith et al. | 414/540 |

FOREIGN PATENT DOCUMENTS

| | | | |
|---|---|---|---|
| DE | 4114044 | * | 11/1991 |
| DE | 9408263 U | | 8/1994 |
| DE | 4341906 | * | 6/1995 |
| DE | 9420587 U | | 9/1995 |
| DE | 29807108 U | | 7/1998 |
| EP | 0818351 A | | 1/1998 |
| EP | 0733003 B1 | | 9/1998 |
| FR | 2504465 A | | 10/1982 |
| GB | 2277909 | * | 11/1994 |
| JP | 58180328 A | | 10/1983 |

* cited by examiner

*Primary Examiner*—Steven A. Bratlie
(74) *Attorney, Agent, or Firm*—Breneman & Georges

(57) ABSTRACT

The invention relates toga vehicle comprising loading boxes (2) for receiving loads. At least one part of the loading boxes (2) can be raised or lowered in vertical direction by means of lifting devices (3), the lifting devices (3) being disposed in a central chassis (5) extending in longitudinal direction of the vehicle. When viewed in longitudinal direction of the vehicle, the lifting devices (3) are disposed in the loading boxes (2) in such a way that practically all the space above the central chassis (5) can be used as additional loading area (15).

12 Claims, 6 Drawing Sheets

Position A

Fig. 2

Position A
Fig. 3

Position B
Fig. 4

Position C
Fig. 5

VEHICLE WITH LOADING BOXES FOR RECEIVING LOADS

BACKGROUND OF THE INVENTION

1. Field of the Invention

The invention relates to a vehicle with loading boxes receiving loads, at least one of the loading boxes being capable of being raised and lowered in the vertical direction by lifting devices, the lifting devices being arranged and the middle frame running in the longitudinal direction of the vehicle, and the loading boxes being capable of being unloaded, level with the ground, in a lower position.

2. Description of Related Art Including Information Disclosed Under 37 CFR 1.97 and 1.98

A generic vehicle with a body is described in EP 07 33 003 B1. Here, however, it is not possible to load both loading boxes, without the vehicle having to be turned around on the loading ramp.

U.S. Pat. No. 3,666,130 describes a similar vehicle. It is likewise not possible, here, for loads to be loaded from one side of the vehicle to the other side.

A vehicle, in which two loading boxes can be lowered from a driving position into a ground-level position for unloading via hydraulic/pneumatic cylinders, is also described in FR 2 504 465. The mechanism, here, is arranged in the region above the middle frame, in a comparable way to the two publications mentioned above, in such a way that, here too, it is not possible for loads, to be loaded through, since the space above the middle frame is occupied by the mechanism and by reinforcing elements.

DE 94 08 263 U1 describes a vehicle, in which loading boxes can be lowered into a ground-level position for unloading by means of lifting devices arranged on the middle frame. In this case, the complete body is connected to the loading boxes and is moved together with these. Here too, in a disadvantageous way, it is not possible for loads to be loaded through, since the loading boxes are fixed in the driving position via bracing cones; and it is not possible for the loading boxes to be raised beyond this driving position. Another disadvantage is that, in the region of the rear axle, part of the loading surface above the middle frame is rigidly formed. Due to the roof structure moved together with the loading boxes, this loading surface can be utilized only over a very small part of its height, since there is otherwise a collision between the roof, the vehicle and the load supported there.

EP 0 818 351A, DE 298 07 108 U1 and U.S. Pat. No. 4,708,572 A in each case describe bodies, in which parts of the loading surface of the vehicle are brought partially laterally next to the vehicle via lever mechanisms or the like and at the same time or thereafter are lowered. As a result of this lateral movement taking place additionally to the lowering, in a disadvantageous way, on the one hand, the activating elements become very complicated and therefore susceptible to faults and heavy and, on the other hand, the lateral space requirement necessary for unloading the articles from the vehicle is very high.

As regards the further general prior art, reference may also be made to JP 58 180328 A which shows a loading surface, part of which can be lowered via a kind of scissor structure. Here, however, as a consequence of the design, no lowering to the ground can take place, so that it becomes only slightly easier for the vehicle to be unloaded.

BRIEF SUMMARY OF THE INVENTION

The object on which the invention is based is to provide a vehicle, in which the loading boxes can be raised and lowered, while at the same time it should be possible for the loads to be loaded through from one side of the vehicle to the other, and it is also possible to transport loads which extend transversely over. the entire width of the vehicle.

This object is achieved, according to the invention, in that at least one of the loading boxes can be brought into at least three positions by the lifting devices, the lifting devices being arranged on the loading boxes, as seen in the longitudinal direction of the vehicle, in such a way that the largest part of the space above the middle frame is available as a further loading surface, in an upper position bottoms of the loading boxes being located at the same height as the further loading surface, a normal driving position of the vehicle being between the upper and the lower position, and the vehicle also being capable of being driven in the upper position.

The arrangement according to the invention of the lifting devices makes it possible to install a further rigid loading surface on the middle frame of the vehicle and thus make it possible to load from the right side of the vehicle to the left side over this loading surface.

It is advantageous, in this case, that the loading boxes can be brought into at least three positions by the lifting devices and, in a lower position, the loading boxes are capable of being unloaded level with the ground, the normal driving position of the vehicle being between the upper and the lower position, and the vehicle also being capable of being driven in the upper position. In addition to the advantages already known from the generic vehicle, this affords the advantage that, since the vehicle is also capable of being driven in the upper position of the loading boxes, bulky loads which cover both loading boxes and the further loading surface lying above the middle frame can be transported.

In the upper position, the bottoms of the loading boxes are at the same height as the further loading surface, this corresponding at the same time to the ramp height in a particularly advantageous refinement. By the ramp height is meant, here, that height which, in the case of loading ramps for vehicles, in particular heavy goods vehicles, is generally customary for loading them.

In an advantageous refinement of the invention, there may be provision for the lifting devices to be arranged at the edge or at the front and/or rear end region of the loading boxes on the middle frame.

This constitutes an even more advantageous arrangement of the lifting devices, without these being capable of causing an obstruction when loads are being loaded through.

In a further advantageous development, there may be provision for the lifting devices each to have at least one transverse yoke which runs transversely to the longitudinal direction of the vehicle, bottoms of the loading boxes being connected to the transverse yoke by means of tie rods.

By means of the suspension of the loading boxes on the transverse yoke, the loading boxes can be raised and lowered in a highly advantageous way. At the same time, the loading surface has no disturbing obstacles apart from the tie rods and the lifting devices.

Advantageously, there may be provision, furthermore, for the loading boxes to have laterally and, if appropriate, also at the rear, on the outside of the vehicle, tailboards which can be fixed in at least one position pointing upward approximately perpendicularly to the bottom of the loading box and one position pointing approximately perpendicularly downward.

It is thereby advantageously possible to fold the tailboards downward and fasten them there when the vehicle is driven with loaded loads, the loading boxes being in the upper position. The downwardly folded tailboards then serve as drive-under protection, so that a passenger car, in the event of an accidental collision with the vehicle according to the invention, cannot penetrate under the structure of the vehicle body.

BRIEF DESCRIPTION OF THE SEVERAL VIEWS OF THE DRAWINGS

Further advantageous refinements and developments of the invention are described in the further subclaims and may be gathered from the exemplary embodiments described below with reference to the drawing in which:

DETAILED DESCRIPTION OF THE INVENTION AND BEST MODE

Figure 1:
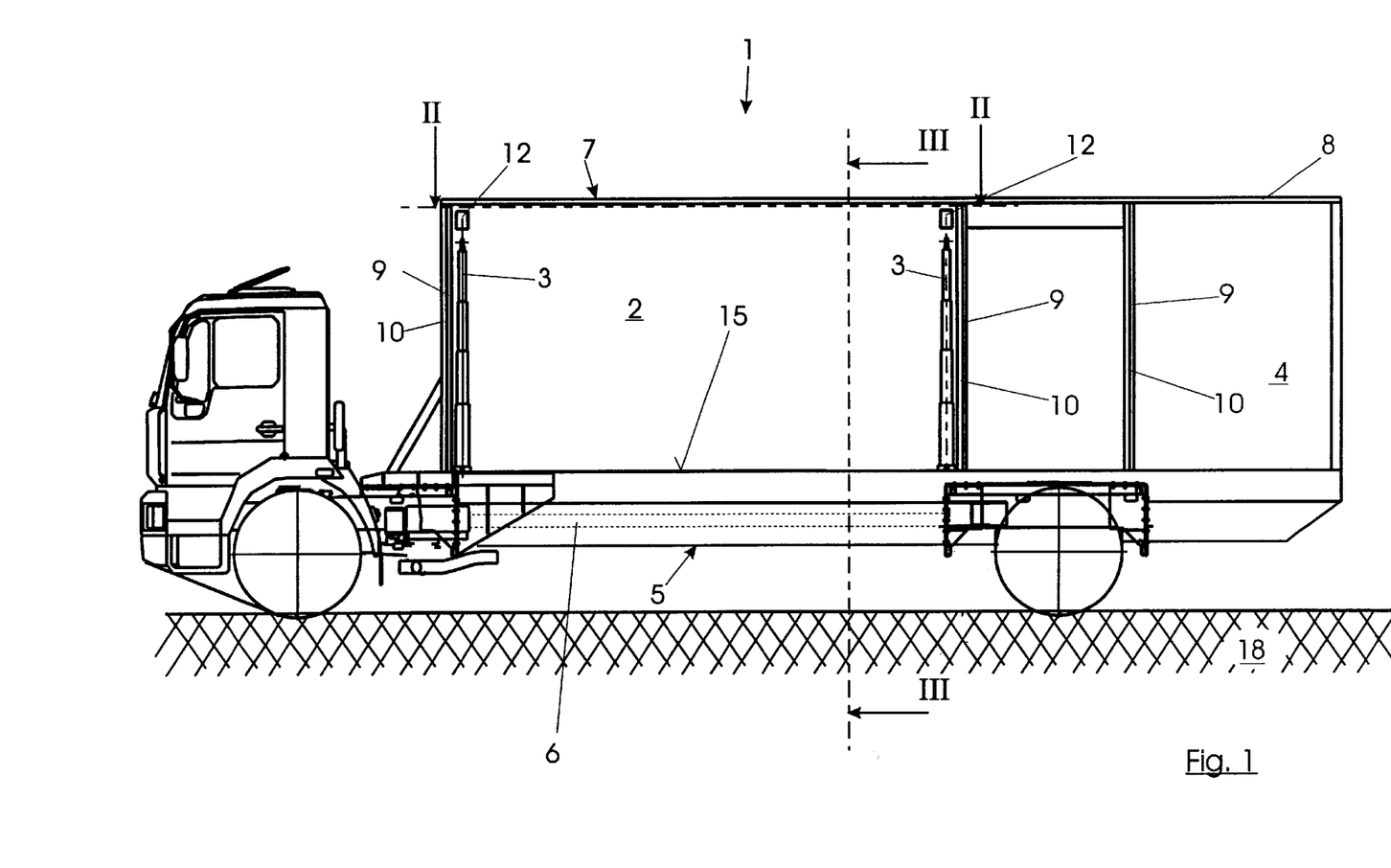
FIG. 1 shows a side view of the vehicle with loading boxes for receiving loads.

A vehicle 1 with loading boxes 2 and lifting devices 3, for example hydraulic and/or pneumatic cylinders capable of being extended in a multistep manner, in the middle region of the vehicle 1 can be seen in FIG. 1. A rear structure 4 is not illustrated in any more detail here and may be designed, for example, according to EP 0 733 003 B1.

The lifting devices 3 are, in this case, fastened on the middle frame 5 of the vehicle 1, and the cardan shaft 6 serving for driving the vehicle runs under this middle frame 5. Located above the loading boxes 2 is a roof structure 7 which is composed of a roof 8, partitions 9, girders 10 and side walls 11 (to be seen only in FIGS. 3 to 6). A transverse yoke 12 can be seen in each case at the upper end of the lifting devices 3 below this rigid roof structure 7.

Figure 2:
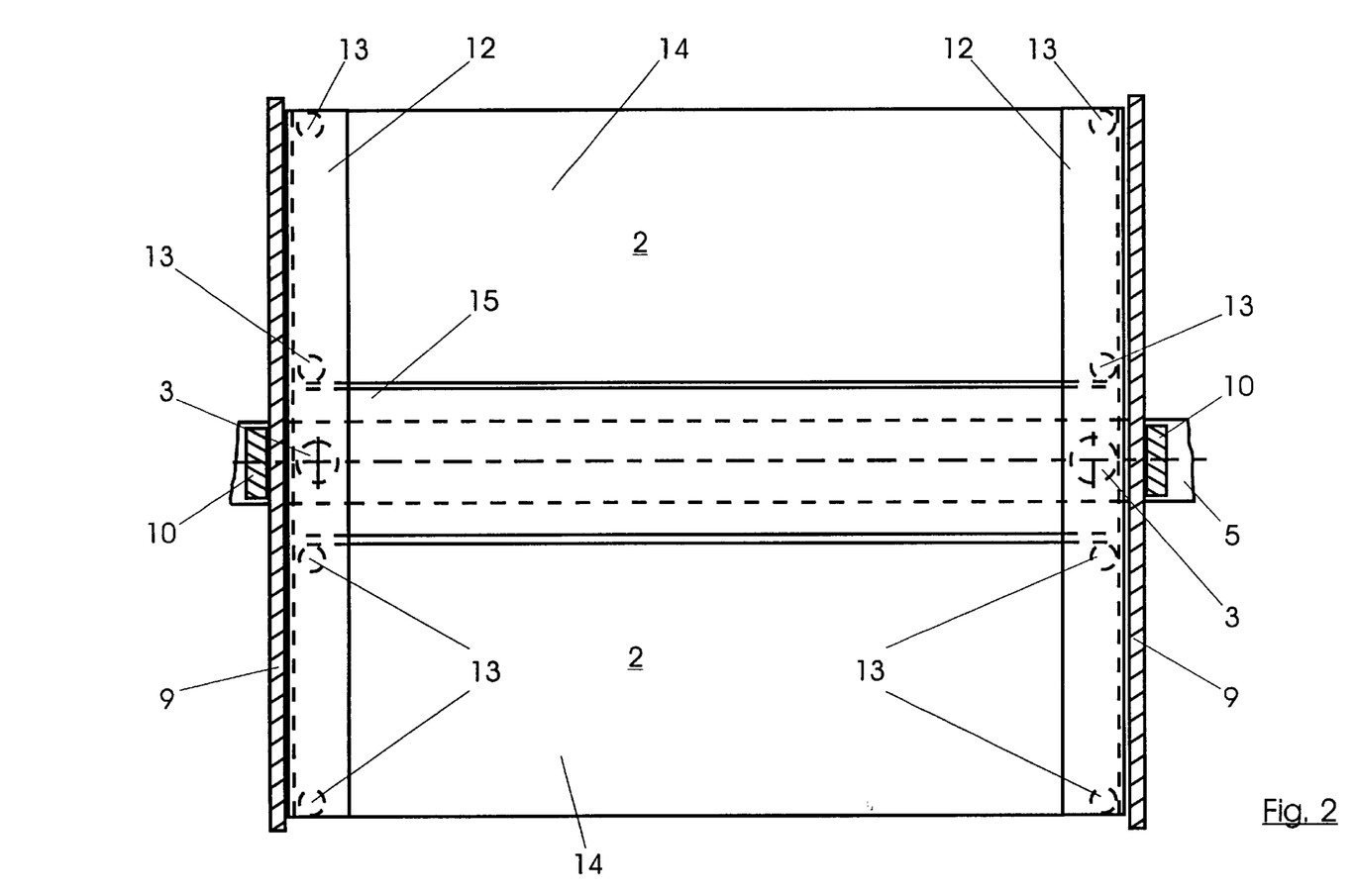
FIG. 2 shows a diagrammatic sectional illustration along the line II—II in FIG. 1.

In FIG. 2, a diagrammatic sectional illustration, part of the body of the vehicle 1, without the roof 8, is illustrated. The girders 10 for the roof structure 7 and two of the partitions 9 can be seen on the middle frame 5. Furthermore, the lifting devices 3 are mounted on the middle frame 5 and one of the transverse yokes 12 is arranged on each of the lifting devices 3. Located next to the middle frame 5 are the bottoms 14 of the loading boxes 2, said bottoms being connected to the transverse yokes 12 via tie rods 13. Thus, by means of the lifting devices 3, the bottoms 14 of the loading boxes 2 can be raised and lowered in the vertical direction via the transverse yokes 12 and the tie rods 13. Moreover, a further loading surface 15 arranged directly above the middle frame 5 can be seen in the top view.

In this case, the lifting devices 3 are arranged on the loading boxes 2 in such a way that it is possible to load through from one loading box 2 to the other loading box 2 over the further loading surface 15. For this purpose, the lifting devices 3 are arranged at the edge or, as seen in the longitudinal direction of the vehicle, at the front and rear end regions of the loading boxes 2.

Figure 4:
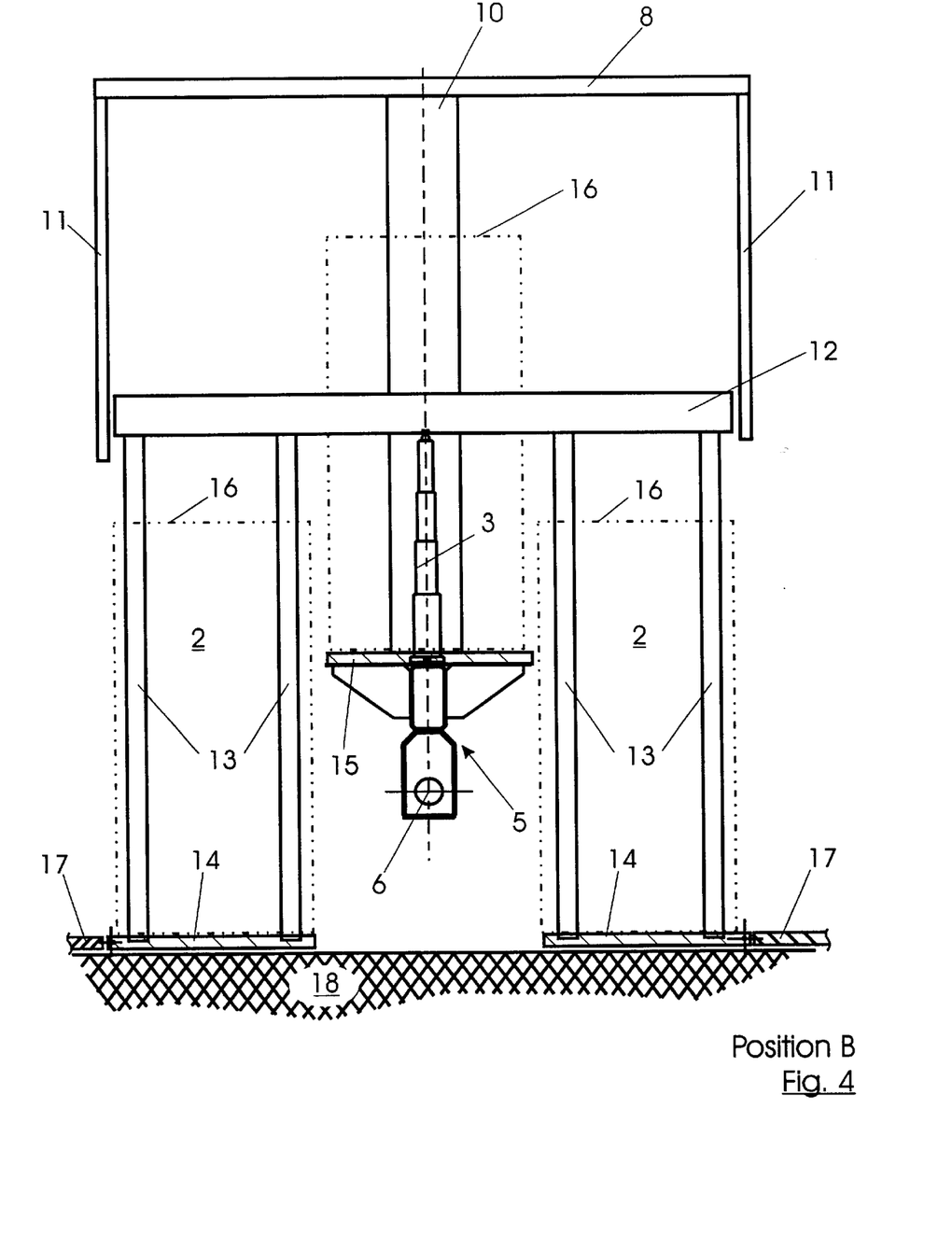
FIG. 4 shows a diagrammatic sectional illustration of the body of the vehicle along the line III—III in FIG. 1, in the lower position of the loading boxes.
Figure 5:
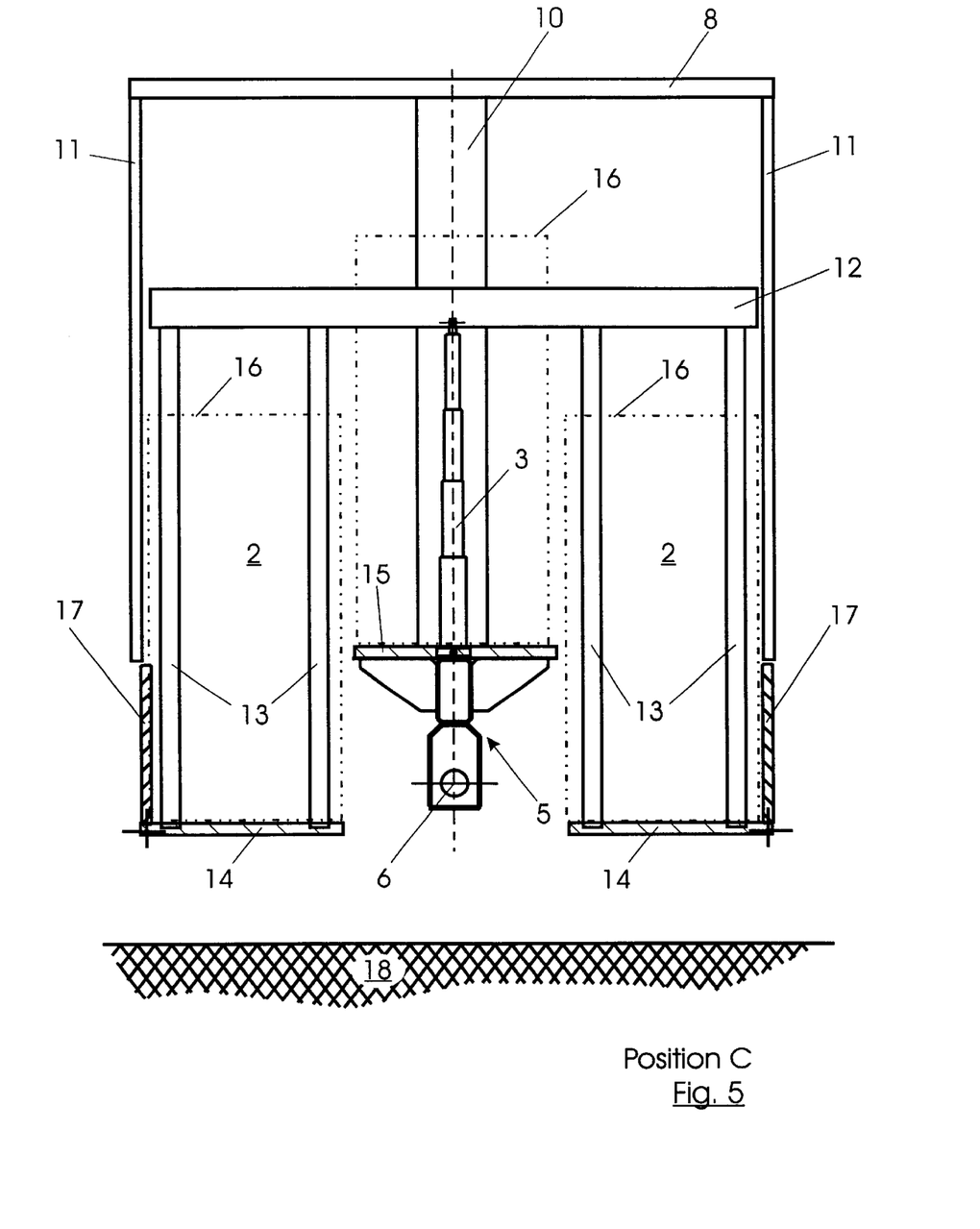
FIG. 5 shows a diagrammatic sectional illustration of the body of the vehicle along the line III—III in FIG. 1, in the middle position of the loading boxes.
Figure 6:
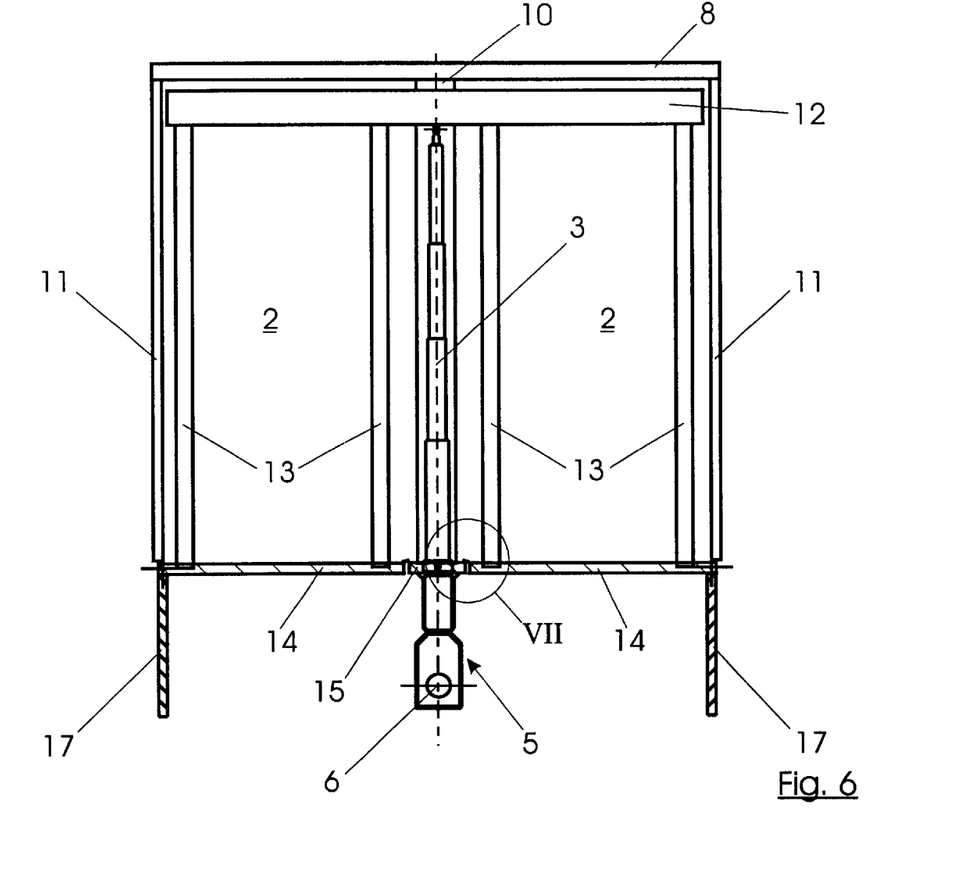
FIG. 6 shows a diagrammatic sectional illustration of the body of the vehicle along the line III—III in FIG. 1, in an alternative version.

The exemplary embodiment selected for the following FIGS. 3 to 6 shows two loading boxes 2 which have the same width as the rigid loading surface 15 arranged above the middle frame 5 of the vehicle 1. An alternative design possibility to this is shown in FIG. 6, the loading boxes 2 having the maximum possible width and the further loading surface 15 being correspondingly narrow.

Figure 3:
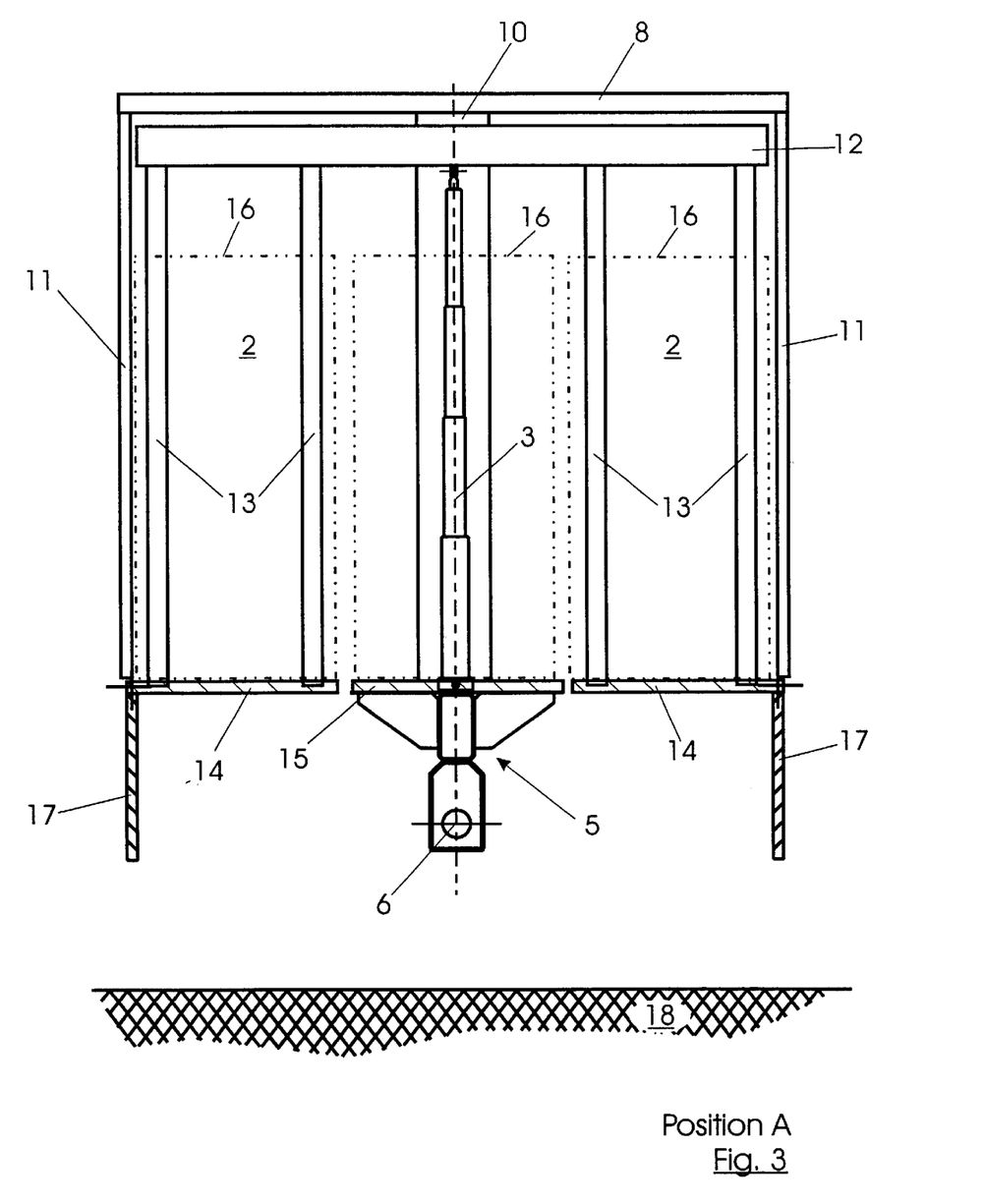
FIG. 3 shows a diagrammatic sectional illustration of the body of the vehicle along the line III—III in FIG. 1, in the upper position of the loading boxes.

When the loading boxes 2 are in the upper position A illustrated in FIG. 3, the bottoms 14 of the loading boxes 2 lie with their top edges at the same height as the rigid loading surface 15 above the middle frame 5. It is possible for a load 16 to be loaded through from one side of the vehicle 1 in this position A, the load 16 being indicated here by the contours of three commercially available rolling containers 16.

By virtue of the possibility of loading the load 16 through from one side of the vehicle 1, the vehicle does not have to be maneuvered after it has been half-loaded, in order to bring its side not yet loaded up to the loading ramp.

Normally, when the vehicle 1 is being driven, the loading boxes 2 are lowered into a position C (illustrated in FIG. 5) located below the position A. However, it is also possible to drive the vehicle 1 in the position A illustrated. In this case, the tailboards 17 mounted on the right and left on the outside of the vehicle can serve as drive-under protection for the body of the vehicle 1. For this purpose, as illustrated, the tailboards 17 are folded downward and fixed there.

The side walls 11 of the vehicle body are designed in a known way as roll-up boards 11 and, when the loading boxes 2 are in the upper position A, reach down as far as the bottoms 14 of the latter.

FIG. 4 illustrates the lower position B of the loading boxes 2 which is provided for unloading the load without a loading ramp and in which the load 16 can be unloaded level with the ground. In this case, the tailboards 17 serve as a transition from the loading box 2 on to a surrounding ground 18. In order to unload the load 16 supported on the loading surface 15 arranged above the medium frame 5, the loading boxes 2, after being unloaded, first have to be brought into the upper position A. The load 16 supported on the middle loading surface 15 can then be moved into one of the loading boxes 2. The load 16 can be unloaded from the loading boxes 2, level with the ground, after they have been lowered once again into the position B.

The position C of the loading boxes 2 which is customary during travel can be seen in FIG. 5. Due to the low position of the loading boxes 2 in; the position C, there is no need for drive-under protection,. so that the tailboards 17 perform their actual principal function and the upwardly folded tailboards 17 can close the lateral gap which lies between the lowest possible position of the roll-up boards 11 and the bottoms 14 of the loading boxes 2.

Since the center of gravity of the entire system is much lower, as compared with position A, the middle position C has a very positive effect on the driving behavior of the vehicle 1. This should therefore be selected for driving the vehicle 1, whenever the dimensions of the load 16 allow it.

FIG. 6 describes an alternative version of the vehicle 1 in the view known from the previous figures, the bottoms 14 of the loading boxes 2 here being selected in a version which is as wide as possible. The loading surface 15 remaining above the middle frame 5 only has the width which is absolutely necessary to avoid damaging the middle frame 5 when the loading boxes 2 are being lowered.

Figure 7:
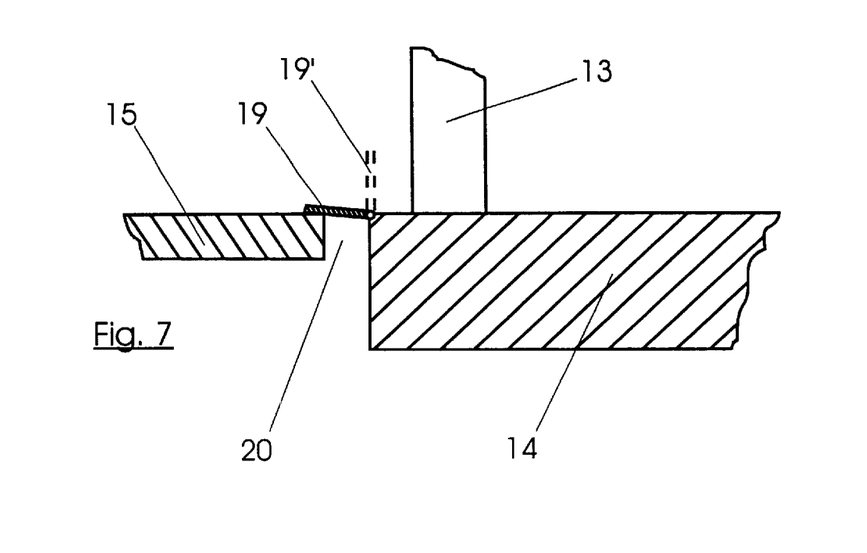
FIG. 7 shows a detail VII according to FIG. 6.

FIG. 7 illustrates an enlargement of the detail VII of FIG. 6. It can be seen, here, that in each case a movable part designed as a metal plate 19 is movably connected to the bottoms 14 of the loading boxes 2. When the loading box 2 is in the position A, this metal plate 19 can be folded via a joint 20 between the bottom 14 of the loading box 2 and the further loading, surface 15. When the vehicle 1 is being loaded, the metal blade 19 assists in making it possible, for example, for lift trucks to travel more easily over the joint 20. Before the loading boxes 2 are lowered from the upper position A, the metal plates 19 must be brought into a vertically upward-pointing position of the plates 19' and fixed. This ensures that the load 16 does not project laterally beyond the bottoms 14 of the loading boxes 2, with the result that, when the loading boxes 2 are being lowered from the position A or raised again into the position A, part of the middle frame 5 or of the further loading surface 15 could be damaged by the load 16.

It is, of course, conceivable and expedient to mount the metal plates 19 on the bottoms 14 of the loading boxes 2 not only in the exemplary embodiment illustrated in FIG. 6, but also in all the other versions of the vehicle 1. Although the metal plate 19 cannot be seen in FIG. 3 to FIG. 6, even there the bottoms 14 of the loading boxes 2 are equipped in each case with the advantageous metal plate 19.

In the design of the vehicle 1, it is, of course, possible to have various further versions, in particular with regard to the width of the loading boxes 2 and the further loading surface 15, so that the body of the vehicle 1 can easily be adapted to the requirements determined by its intended use and to the load 16 to be expected.

What is claimed is:

1. A vehicle (1) for carrying loads comprising:
    (a) loading boxes (2) for receiving loads, wherein at least one of the loading boxes (2) is capable of being raised and lowered in the vertical direction down to the ground;
    (b) lifting devices (3) for raising and lowering said at least one loading box level with the ground; and
    (c) a middle frame (5) running in the longitudinal direction of the vehicle and having a loading surface disposed intermediate the ends of said middle frame, said middle frame providing support for said loading surface and said lifting devices and allowing said at least one loading box to be unloaded level with the ground, in a lower position (B), and wherein said at least one loading box (2) can be brought into at least three positions (A, B, C) by said lifting devices in such a way that said loading surface on said middle frame (5) is available as a further loading surface (15), when said loading boxes are at the same height as said loading surface (15) on said middle frame said combination providing a normal driving position (C) of the vehicle being between the upper and the lower position (A, B), and the vehicle (1) also being capable of being driven in the upper position (A).

2. The vehicle of claim 1 in which both of said loading boxes can be raised and lowered to the ground.

3. The vehicle according to claim 1 or 2 in which in the upper position (A), the bottoms (14) of said at least one of said loading boxes (2) is at rest at ramp height.

4. The vehicle according to claim 1 or 2 in which said lifting devices (3) are disposed at an end region of the loading boxes (2) on the middle frame (5).

5. The vehicle according to claim 1 or 2 in which said lifting devices (3) each have at least one transverse yoke (12) which runs transversely to the longitudinal direction of the vehicle and which is connected to at least one of the loading boxes (2).

6. The vehicle according to claims 1 or 2 in which said at least one loading box (2) have tie rods (13) between a bottom (14) of the loading box (2) and one of the transverse yokes (12).

7. The vehicle according to claims 1 or 2 in which said loading boxes (2) have tailboards (17) on at least some regions of the outside of the vehicle (1), th,e tailboards (17) being capable of being fixed in at least one position pointing upward approximately perpendicularly to the bottom (14) of the loading box (2) and one position pointing downward approximately perpendicularly to the bottom (14) of the loading box (2).

8. The vehicle according to claims 1 or 2 in which the bottoms (14) of the loading boxes (2) have, on their side facing the middle frame (5) of the vehicle (1) movable parts (19) which, when the loading boxes (2) are in the upper position (A), come to rest over a joint (20) between the loading box (2) and further loading surface (15), and which, in all the other positions (B, C) of the loading boxes (2), can be fixed in a position pointing upward.

9. The vehicle according to, claims 1 or 2 in which at least one of the right loading boxes (2) and one of the left loading boxes (2) have the same width transversely to the longitudinal direction of the vehicle, the further loading surface (15) also having this width.

10. The vehicle according to claims 1 or 2 in which at least one of the right loading boxes (2) and one of the left loading boxes (2) have the same width transversely to the longitudinal direction of the vehicle, the further loading surface (15) having only the width necessary for covering the middle frame (5) of the vehicle (1) at least approximately completely.

11. A load carrying vehicle comprising:
    (a) a vehicle frame having a middle portion said middle portion providing a middle load surface said middle load surface running in a longitudinal direction intermediate the ends of said vehicle frame;
    (b) a lifting device disposed on said frame;
    (c) a first loading compartment disposed laterally adjacent to said middle portion and connected to said lifting device for raising said first loading compartment from an upper docking position to an intermediate lower position to an unloading ground level position said first loading compartment having an open side providing an open loading communication with said middle load surface when said first loading compartment is in planar alignment with said middle load surface; and
    (d) a second loading compartment disposed on said frame laterally adjacent to said middle portion and connected to said lifting device for raising and lowering said second loading compartment from an upper docking position to an intermediate lower position said second loading compartment having an open side providing an open loading communication with said middle load surface and said first loading compartment when said first loading compartment and said second loading compartment are disposed in planar alignment with said middle load surface.

12. A cargo carrying vehicle comprising:
    (a) a vehicle frame, having a middle frame portion running in the longitudinal direction of the vehicle said middle frame portion providing a fixed loading surface disposed intermediate the ends of said middle frame portion;

(b) lifting devices disposed perpendicular to and intermediate the ends of said middle frame portion;

(c) a first loading box having a first moveable loading surface terminating in an open side disposed laterally adjacent to said middle frame portion and connected to said lifting device for raising and lowering said first loading box from a dock loading position to a position of coplanar alignment between said first moveable loading surface and said fixed loading surface; and (d) a second loading box having a second moveable loading surface terminating in an open side disposed laterally adjacent to said middle frame portion and connected to said lifting device, said lifting device raising and lowering said second loading box from a ground loading position to a position of coplanar alignment between said second moveable loading surface and said fixed loading surface and provide an open loading communication between said open side of said first loading box and said open side of said second loading box through said fixed loading surface; and (e) a plate for connecting said fixed loading surface with said first moveable loading surface or said second moveable loading surface.

* * * * *